United States Patent
Brown et al.

(10) Patent No.: US 7,912,805 B2
(45) Date of Patent: Mar. 22, 2011

(54) SYSTEM FOR MATCHING PATTERN-BASED DATA

(75) Inventors: Paul Geoffrey Brown, San Jose, CA (US); Jussi Petri Myllymaki, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 116 days.

(21) Appl. No.: 12/335,309

(22) Filed: Dec. 15, 2008

(65) Prior Publication Data
US 2009/0132454 A1 May 21, 2009

Related U.S. Application Data

(63) Continuation of application No. 11/174,396, filed on Jul. 2, 2005, now Pat. No. 7,487,150.

(51) Int. Cl.
*G06F 17/00* (2006.01)
*G06F 15/18* (2006.01)
*G06F 7/00* (2006.01)
*G06F 17/30* (2006.01)
*G06N 5/02* (2006.01)
*G06E 1/00* (2006.01)
*G06E 3/00* (2006.01)
*G06G 7/00* (2006.01)

(52) U.S. Cl. ............. 706/48; 707/737; 707/749; 706/20

(58) Field of Classification Search ............. 707/737, 707/749, 750, 776, 999.006; 706/20, 48
See application file for complete search history.

(56) References Cited

U.S. PATENT DOCUMENTS

| 5,627,748 | A  | * | 5/1997  | Baker et al.    | 715/210     |
|-----------|----|---|---------|-----------------|-------------|
| 6,131,092 | A  | * | 10/2000 | Masand          | 707/999.006 |
| 6,292,830 | B1 |   | 9/2001  | Taylor et al.   |             |
| 6,519,609 | B1 |   | 2/2003  | Touzet          |             |
| 6,618,725 | B1 | * | 9/2003  | Fukuda et al.   | 707/999.006 |
| 6,708,166 | B1 | * | 3/2004  | Dysart et al.   | 707/765     |

(Continued)

FOREIGN PATENT DOCUMENTS

JP    2001134575 A    5/2001

(Continued)

OTHER PUBLICATIONS

Dana Angluin, "A Note on the Number of Queries Needed to Identify Regular Languages," Information and Control 51, pp. 76-87 (1981).

(Continued)

*Primary Examiner* — Donald Sparks
*Assistant Examiner* — Benjamin Buss
(74) *Attorney, Agent, or Firm* — Shimokaji & Associates, P.C.

(57) ABSTRACT

A pattern-based data matching system matches pattern-based data. The data matching system generates a regular expression pattern for input datasets and describes similarity measures between the generated patterns. The data matching system analyzes an input dataset in terms of symbol classes, generalizing input values into a general pattern to allow identification or extrapolation of overlap between input datasets, aiding in matching fields in databases that are being merged and in learning a pattern for an input dataset. For each sequence of data values, the present system computes a compact pattern describing the sequence. Embodiments of the data matching system comprise noise reduction and repetitive pattern discovery in the input dataset and calculation of recall and precision of the generated pattern.

7 Claims, 15 Drawing Sheets

U.S. PATENT DOCUMENTS

| | | | |
|---|---|---|---|
| 6,763,125 B2 | 7/2004 | Ohta | |
| 6,832,359 B2 | 12/2004 | Abe et al. | |
| 6,842,796 B2* | 1/2005 | Zweig et al. | 710/16 |
| 6,901,399 B1 | 5/2005 | Corston et al. | |
| 6,912,526 B2* | 6/2005 | Akaboshi | 707/999.006 |
| 6,920,452 B2 | 7/2005 | Dieberger | |
| 7,092,926 B2* | 8/2006 | Cerrato | 706/48 |
| 7,099,857 B2* | 8/2006 | Lambert | 706/48 |
| 7,136,710 B1 | 11/2006 | Hoffberg et al. | |
| 7,174,279 B2 | 2/2007 | Conner | |
| 2001/0047359 A1 | 11/2001 | Videcrantz et al. | |
| 2002/0138480 A1* | 9/2002 | Wang et al. | 707/6 |
| 2002/0159616 A1 | 10/2002 | Ohta | |
| 2003/0126117 A1 | 7/2003 | Megiddo et al. | |
| 2003/0139957 A1 | 7/2003 | Satchwell | |
| 2003/0229636 A1* | 12/2003 | Mattausch et al. | 707/6 |
| 2004/0006566 A1 | 1/2004 | Taylor et al. | |
| 2004/0107059 A1* | 6/2004 | Happel | 706/48 |
| 2005/0192960 A1* | 9/2005 | Inakoshi et al. | 707/6 |
| 2006/0020595 A1* | 1/2006 | Norton et al. | 707/6 |
| 2006/0179071 A1 | 8/2006 | Panigrahy et al. | |
| 2006/0259884 A1 | 11/2006 | Fong et al. | |

FOREIGN PATENT DOCUMENTS

WO     WO 02077910 A1     10/2002

OTHER PUBLICATIONS

A. Brazma et al., "Efficient Learning of Regular Expressions from Good Examples," Institute of Mathematics and Computer Science, University of Latvia, pp. 76-91 (1994).

E. Mark Gold, "Complexity of Automation Identification from Given Data," Information and Control 37, pp. 302-320 (1978).

R.C. Carrasco et al., "Learning Stochastic Regular Grammars by Means of a State Merging Method," Department of Information Technologyh and Computation, University of Alicante, pp. 139-152 (1994).

Sergei Savchenko, "Practical Regular Expression Mining and Its Information Quality Applications," IQ 2002: pp. 177-186.

Leonard Pitt, "Inductive Inference, DFAs, and Computational Complexity," Department of Computer Science, University of Illinois, pp. 18-44 (1989).

* cited by examiner

SYSTEM FOR MATCHING PATTERN-BASED DATA

FIELD OF THE INVENTION

The present invention generally relates to pattern learning, and more specifically, to learning regular expression patterns from an input dataset and quantifying a similarity between datasets by comparing their respective regular expression patterns.

BACKGROUND OF THE INVENTION

Databases are commonly used in businesses and organizations to manage information on employees, clients, products, etc. These databases are often custom databases generated by the business or organization or purchased from a database vendor or designer. These databases may manage similar data; however, the data can be presented in different formats. For example, a database may store a U.S. phone number in a variety of formats such as (123) 555-1234, as 1-123-555-1234, or as 123-555-1234. Furthermore, the databases may manage data in similar format but with no overlap in the values. For example, a database for employees on the west coast of the U.S. can have different area codes from a database for employees on the east coast of the U.S. The data in the phone fields looks similar, but there is no intersection or overlap in the value of the data.

This variability in data format becomes an issue when databases with dissimilar data formats for similar data are merged. Automatic matching of data in databases based on format or value can be difficult to achieve. For example, a business with an extensive customer database may acquire another company. The business wishes to merge or integrate the customer databases. To merge or integrate source databases into a target database, the source databases are analyzed on a field-by-field or table-by-table basis and data matching is performed. The goal of data matching is to determine which field in each of the source databases comprises, for example, the name of the customer, the phone number of the customer, the fax number, etc. and match the tables in the source databases on a field-by-field basis.

Data matching determines whether two input datasets or two sequences of data values are similar and quantifies the similarity. One conventional approach for data matching uses meta-data in schema-based data matching. Schema-based data matching examines names of fields and names of tables in databases, attempting to match data in fields through the name of the field. In one source, a field for a client phone number may be named CLIENTPHONE. In another source, a field for a client phone number may be PNUMCLIENT. Schema-based data matching may use techniques such as linguistic analysis to locate and match these fields.

While schema-based data matching has proven to be useful, it would be desirable to present additional improvements. Schema-based matching has difficulty in matching fields when a database designer uses cryptic field names or table names. Furthermore, schema-based matching typically cannot identify matching fields when designers speaking different languages write source databases. For example, one source database may have field names cryptically derived from the German language while another source database may have field names cryptically derived from the English language.

Another conventional data matching approach uses instance-based data matching. Instance-based matching utilizes statistics in the form of a distribution of actual values in a data sequence as a basis for similarity computation. Instance-based data matching examines values in a field independently of the field name. One instance-based data matching approach examines overlap between values in fields of source databases. If, for example, a 100% overlap exists between a field in one source database and a field in another source database, the fields are determined to be identical and they match. Another instance-based data matching approach examines a statistical distribution of values in a field. Fields in source databases are determined to be similar if the distribution is similar.

Although instance-based data matching has proven to be useful, it would be desirable to present additional improvements. Instance-based data matching cannot match source datasets that have disjoint data with no overlap. An example of such disjoint datasets is employee phone numbers for merging companies in which the phone numbers for each of the merging companies comprise different area codes. With no overlap between the area codes, instance-based data matching cannot match the source fields for employee phone number. Similar issues affect matching for social security numbers, vehicle ID numbers, credit card numbers, postal codes, etc.

Conventional data matching approaches identify matching fields through field names or through field values. However, often data in fields are presented in a pattern that can be discovered and matched by a data matching technique. What is therefore needed is a system, a service, a computer program product, and an associated method for matching pattern-based data. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for matching pattern-based data. The present system generates a regular expression pattern for an input dataset. The regular expression pattern is a useful and compact pattern that assists data integration or data matching tasks. The terms compact and useful describe patterns that are not overly specific to the input dataset and not overly generic such that similarity is rendered meaningless. The present system further describes similarity measures between the generated patterns.

The present system learns the pattern of values for each field or dataset and computes the similarity between pattern pairs. The present system analyzes an input dataset in terms of symbol classes. Exemplary symbol classes comprise, for example, lower case letters, upper case letters, alphanumeric characters, etc. The present system identifies pattern constructs in the input dataset such as, for example, repetition, alternating symbols, etc. The present system uses a regular expression pattern as a pattern mechanism. For each sequence of data values, the present system computes a compact pattern describing the sequence.

For instance, a dataset in a source database comprises dates in a range from 1700 to 1799; the present system learns a pattern "17<digit><digit>" for this field. A dataset in another source database comprises dates in a range from 1800 to 1899; the present system learns a pattern "18<digit><digit>" for this field. The patterns are very similar; consequently, the present system determines that the underlying datasets are also similar. The degree of similarity can be determined in various ways such as, for example, computing the string-edit distance between the two patterns.

The present system comprises a pattern construction module, a delimiter removal module, and a similarity computation module. The pattern construction module generalizes a pattern from specific examples of a value provided by an input dataset into a general pattern that uses symbol classes. Generalizing the input values into a general pattern allows identification or extrapolation of overlap between input datasets, aiding in matching fields in databases that are being merged. Generalizing the input values into a general pattern further assists the present system in learning a pattern for an input dataset.

In one embodiment, the present system comprises a controlled classification module to control classification of values in an input dataset during vocabulary expansion. In another embodiment, the present system comprises a controlled noise reduction module to reduce noise and remove infrequent values in an input dataset during vocabulary expansion. In yet another embodiment, the present system comprises a delimiter removal module to eliminate constant symbols from a pattern. In a further embodiment, the present system comprises a repetitive pattern discovery module to discover and identify repetitive patterns in an input dataset during vocabulary expansion. In yet another embodiment, the present system comprises a recall calculation module to calculate recall of a generated pattern and a precision calculation module to calculate precision of a generated pattern.

The present system may be embodied in a utility program such as a pattern matching utility program. The present system also provides means for a user to identify one or more input datasets and specify an optional set of requirements for the one or more output patterns generated by the pattern matching utility. The optional set of requirements comprises an expansion factor threshold, a desired recall value, and a desired precision value for the generated pattern. The desired recall value and the desired precision value may each be provided in terms of a threshold or a range of allowable values. In one embodiment, the pattern matching utility program provides means for a user to identify a frequency threshold at which a value may be determined as noise.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Behavior: an inherent property of an input dataset that determines how a pattern representing the dataset diminishes in size or becomes more compact as a maximum allowed expansion factor increases and precision decreases.

Convergence Rate: A rate at which a pattern representing an input dataset converges to a universal pattern.

Expansion Factor: Let/be the input dataset and L(I) be the language of the input dataset. Let P be the pattern and L(P) be the language allowed by the pattern. Furthermore, define |L| as the size of a language L; i.e., the number of distinct strings in that language. The expansion factor) is defined as |L(P)|/|L(I)|.

Pattern: a generalized symbolic representation of values in an input dataset.

Universal Pattern: A pattern comprising any character, any number of times, symbolically represented as ".+".

Figure 1:
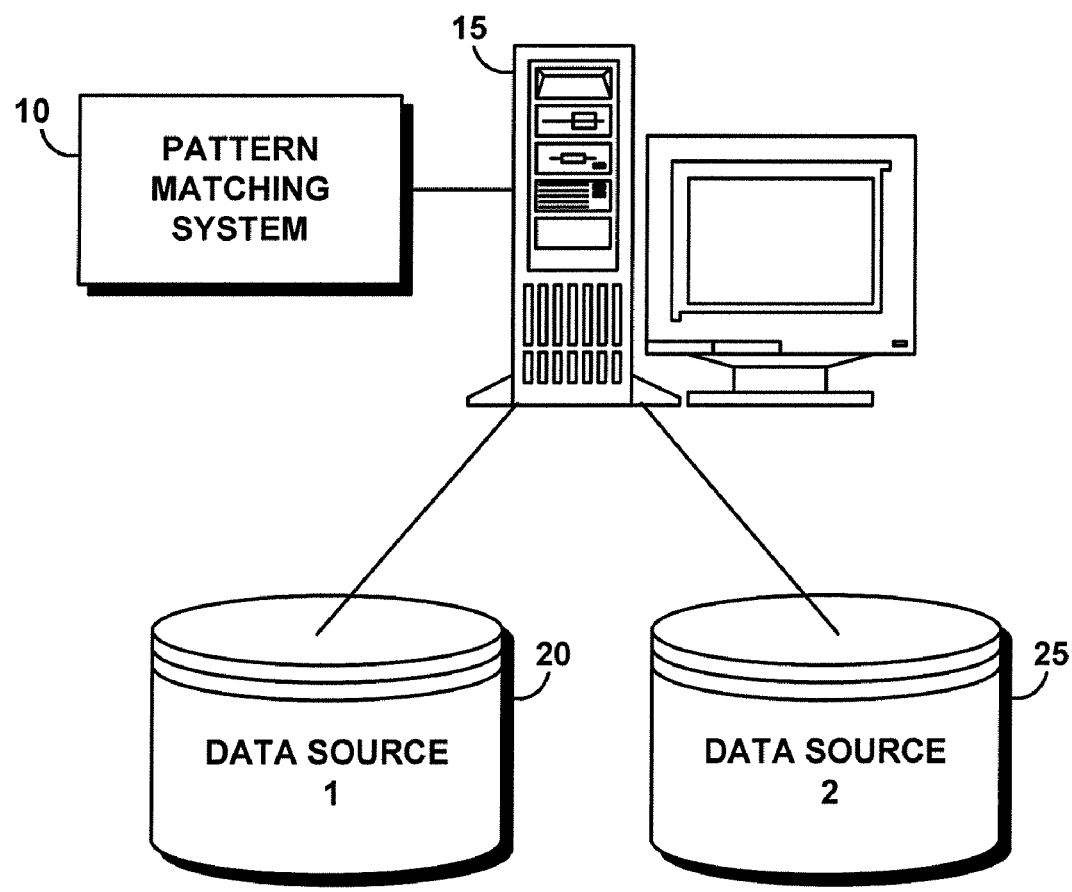
FIG. 1 is a schematic illustration of an exemplary operating environment in which a pattern matching system of the present invention can be used.

FIG. 1 portrays an exemplary overall environment in which a system and associated method for matching pattern-based data according to the present invention may be used. System 10 comprises a software programming code or a computer program product that is typically embedded within, or installed on a computer 15. Alternatively, system 10 can be saved on a suitable storage medium such as a diskette, a CD, a hard drive, or like devices. Input to system 10 is a data source 1, 20, and a data source 2, 25. System 10 examines one or more input datasets or fields in data source 1, 20, and data source 2, 25, identifying a pattern in one or more datasets in data source 1, 20, or data source 2, 25. While system 10 is described in terms of a database, it should be clear that system 10 is applicable as well to, for example, any data source comprising a set of values.

In general, system 10 learns a pattern by constructing a deterministic finite automaton from the input dataset. The deterministic automaton comprises an initial node, an end node, intermediate nodes, and transitions between nodes. The initial node marks the beginning of a string and the end node marks the end of a string (accepting state). An intermediate node corresponds to a symbol position in an input string. Nodes are linked via transitions such that the system 10 can move that from the initial node to an intermediate node. The intermediate node corresponds to an initial symbol position in an input string. A transition links these initial-position intermediate nodes to nodes corresponding to the next position in an input strings, and so on.

Figure 2:
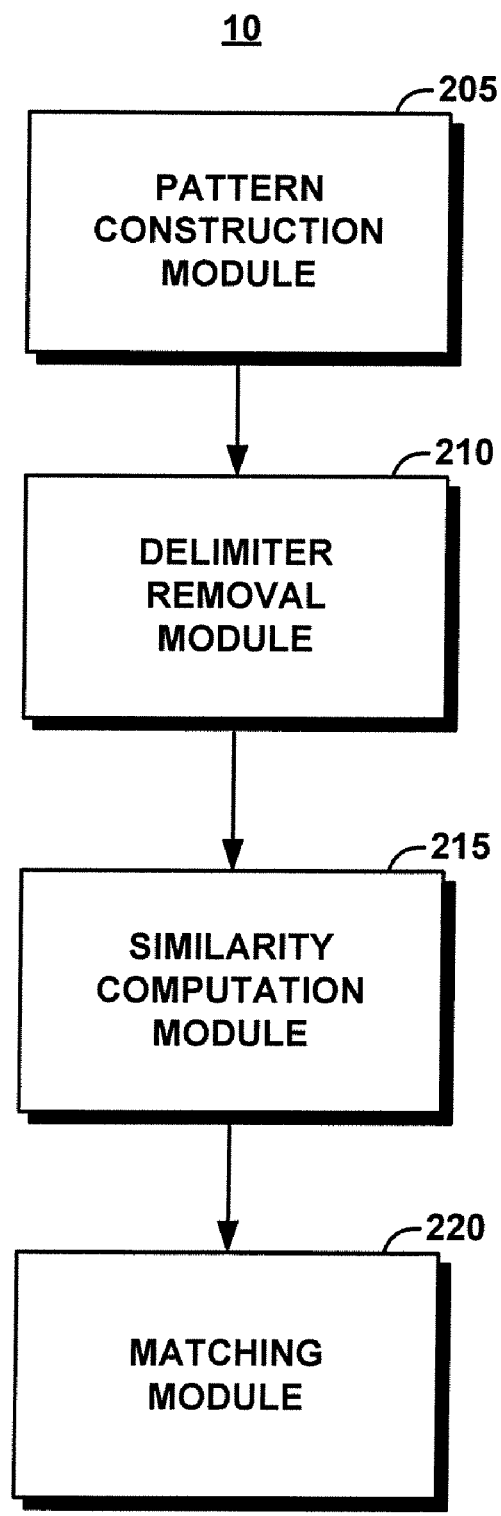
FIG. 2 is a block diagram of the high-level architecture of the pattern matching system of FIG. 1.

FIG. 2 illustrates a high-level hierarchy of system 10. System 10 comprises a pattern construction module 205, a delimiter removal module 210, a similarity computation module 215, and a matching module 220. The pattern construction module 205 expands a language described by a pattern such that the pattern represents a dataset that is broader or more general than an input dataset. For example, consider a sequence of values 1, 3, 4, 7, 9 as an input dataset. System 10 can discover many valid patterns for this sequence. Possible patterns comprise: "1|3|4|7|9", "[13479]", and "[0-9]". The pattern "1|3|4|7|9" and the pattern "[13479]" are equivalent and represent the input dataset precisely; the pattern "1|3|4|7|9" and the pattern "[13479]" do not allow any strings not present in the input dataset. In this example, the pattern "[0-9]" is more general, allowing any single-digit strings.

Let/be the input dataset and L(I) be the language of the input dataset. Let P be the pattern and L(P) be the language allowed by the pattern. Furthermore, define |L| as the size of a language L; i.e., the number of distinct strings in that language. System 10 measures the ratio of expansion (further referenced herein as the expansion factor) as |L(P)|/|L(I)|; i.e., if a pattern allows twice the number of strings compared to the input dataset, expansion is 2. System 10 uses the expansion factor compared to a predetermined expansion factor threshold to determine an extent of generalization of the pattern for the input dataset. The matching module 220 matches the input sets of values based on the similarity computation.

Figure 3:
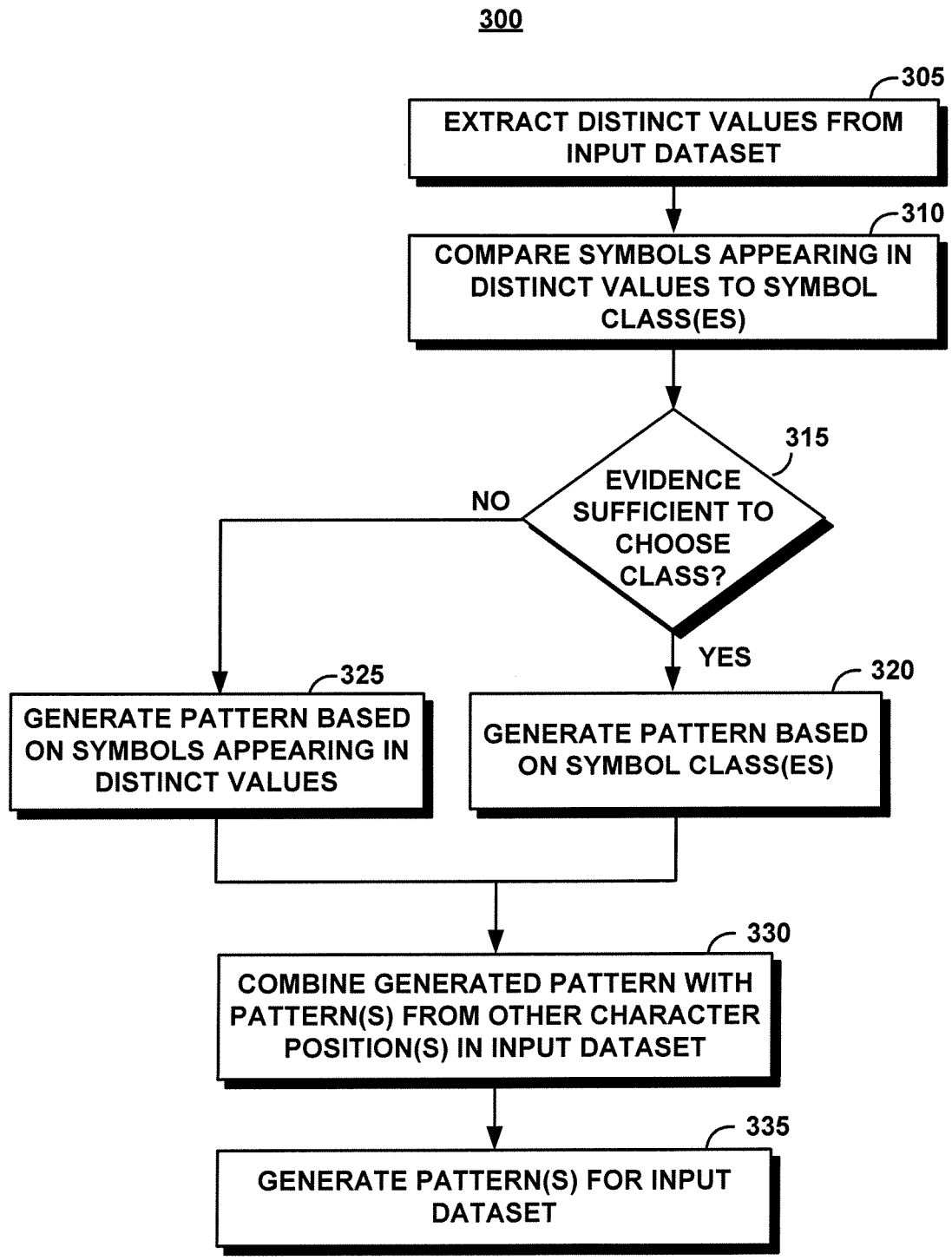
FIG. 3 is a process flow chart illustrating a method of operation of a pattern construction module of the pattern matching system of FIGS. 1 and 2.

FIG. 3 illustrates a method 300 of operation of the pattern construction module 205. The pattern construction module 205 extracts distinct values from an input dataset (step 305). The pattern construction module 205 compares symbols appearing in a given character position in the extracted distinct values to symbols appearing in one or more symbol classes (step 310). The pattern construction module 205 determines whether evidence is sufficient to choose one or more symbol classes to represent all symbols appearing in a given character position in the extracted distinct values (decision step 315). If sufficient evidence is present, the pattern construction module 205 generates a pattern based one or more of the selected symbol classes (step 320). Otherwise, the pattern construction module 205 generates a pattern based on the unexpanded symbols appearing in the given character position in the extracted distinct values (step 325). The pattern construction module 205 combines the pattern generated for one character position with patterns generated for one or more of the other character positions in the input dataset (step 330). The pattern construction module 205 generates one or more patterns representing the input dataset (step 335).

The delimiter removal module 210 removes delimiters from an input dataset. A delimiter is a static component of a pattern; i.e., any character that appears in all values of an input dataset in the same position within a character string representing each of the values. The delimiter removal module 210 removes a delimiter from a pattern to simplify the pattern.

In general, system 10 calculates a support level at an initial node of the deterministic finite automaton. This support level is equivalent to a quantity of input data values. For each node of the deterministic finite automaton, system 10 calculates a support level at that node; i.e., how many input data values require the presence of that node. The delimiter removal module 210 calculates the support level at a node by summing the support values of incoming transitions to that node. If the support level equals that of the initial node and the node represents only a single symbol, then the node is a delimiter and can be removed by the delimiter removal module 210.

Consider the following sample input datasets and the possible patterns that can be discovered for these input datasets. The patterns discovered for the input datasets vary in terms of their generality, compactness, and usability.

For example, an input dataset 1 comprises values 1111, 2222, 3333, 4444. Table 1 illustrates a sample of possible patterns that can be determined for input dataset 1, listed by descending precision. Possible digits in the values of input dataset 1 are represented in brackets. For example, a possible digit [1234] represents a digit in a range of 1 to 4. A possible digit [0-9] represents a digit in a range of 0 to 9. A range in length of a digit sequence of a value is represented by brackets { }. For example, {1,4} represents a range in length of 1 to 4 characters for the digit sequence of input dataset 1; i.e., each value in the input dataset 1 may have 1 to 4 digits.

TABLE 1

A sample of possible patterns for input dataset 1 comprising values 1111, 2222, 3333, 4444.

| Pattern Number | Possible Pattern |
| --- | --- |
| 1A | 1111 | 2222 | 3333 | 4444 |
| 1B | [1234][1234][1234][1234] |
| 1C | [0-9][0-9][0-9][0-9] |
| 1D | [0-9]{1,4} |
| 1E | [0-9]+ |

Pattern 1A is precise, but not very useful if the input dataset 1 comprises a large number of distinct values. Pattern 1B represents input dataset 1 less precisely than pattern 1A; values other than those in input dataset 1 can be represented by possible pattern 1 (i.e., 1234, 1334, 1321, etc.). With lower precision than pattern 1B, pattern 1C is a more useful representation of input dataset 1 in that pattern 1C allows all 4-digit numbers. Pattern 1D is more general in that it allows digit sequences of length 1 to 4 (i.e., 1, 332, 4143, etc.) in addition to the values of the input dataset 1. Pattern 1E allows digit sequences of any length and any value 0 to 9. A human may select pattern 1A as best representing input dataset 1 because the number of distinct values is small and there is no evidence that digits can be mixed or that digit sequences can be shorter or longer than 4.

Another exemplary dataset, input dataset 2, comprises "a 1", "aa b", "aaa 1". Table 2 illustrates a sample of possible patterns that can be determined for input dataset 2, listed by descending precision.

TABLE 2

A sample of possible patterns for input dataset 2 comprising values "a 1", "aa b", "aaa 1".

| Pattern Number | Possible Pattern |
| --- | --- |
| 2A | "a 1 | aa b | aaa 1" |
| 2B | "aa?a? [1b]" |

TABLE 2-continued

A sample of possible patterns for input dataset 2 comprising values "a 1", "aa b", "aaa 1".

| Pattern Number | Possible Pattern |
| --- | --- |
| 2C | "a+ [1b]" |
| 2D | "[a-z]+ [0-9a-z]" |

Pattern 2A is precise, comprising only values listed in input dataset 2. Pattern 2B is less precise, allowing "a b", "aa 1", and "aaa b" that are not in input dataset 2. A symbol followed by a question mark "?" means that the symbol is optional (may or may not appear). Thus, in pattern 2B, the first occurrence of "a" is optionally followed by one or two more occurrences of "a". Pattern 3B is less precise than pattern 2B, allowing any sequence comprising one or more of the letter "a" ([a]+) followed by a "1" or a "b". Pattern 4B is less precise than pattern 3B, allowing any character sequence ([a-z]+) followed by one digit or character {[0-9a-z]}. A human may select pattern 2C as best representing input dataset 2 because the values in input dataset 2 appear to be a variable-length sequence of the letter a followed by a "1" or a "b" as a terminator in the value sequence.

A further exemplary dataset, input dataset 3, comprises 800-123-1245, 800-653-6234, 800-263-6324, 800-346-6243, . . . . Table 3 illustrates a sample of possible patterns that can be determined for input dataset 3, listed by descending precision.

TABLE 3

A sample of possible patterns for input dataset 3 comprising values 800-123-1245, 800-653-6234, 800-263-6324, 800-346-6243, . . .

| Pattern Number | Possible Pattern |
| --- | --- |
| 3A | 800-123-1245 \| 800-653-6234 \| 800-263-6324, . . . |
| 3B | 800-[0-9][0-9][0-9]-[0-9][0-9][0-9][0-9] |
| 3C | [0-9][0-9][0-9]-[0-9][0-9][0-9]-[0-9][0-9][0-9][0-9] |
| 3D | [0-9]+-[0-9]+-[0-9]+ |
| 3E | [\-0-9]+ |
| 3F | .+ |

Pattern 3A is precise but not very useful because the number of distinct values in the pattern is large. Pattern 3B is less precise but more useful than pattern 3A, allowing all "800" phone numbers. Pattern 3C is less precise than pattern 3B, allowing all U.S. telephone numbers. Pattern 3D allows all triplets of digit sequences separated by dashes. Pattern 3E allows any sequence of digits and dashes (e.g., -83-5234-2). Pattern 3F allows any sequence of characters such as digits or numbers. The period symbol "." matches any character and the plus sign "+" means that the symbol may appear any number of times. A human may select pattern 3B because the values appear to be phone numbers in an "800" phone number category.

Yet another exemplary dataset, input dataset 4, comprises (800) 847 6323, (800) 865 3243, (800) 753 8698, (800) 583 8748, . . . . Table 4 illustrates a sample of possible patterns that can be determined for input dataset 4, listed by descending precision.

TABLE 4

A sample of possible patterns for input dataset 4 comprising values (800) 847 6323, (800) 865 3243, (800) 753 8698, (800) 583 8748, . . .

| Pattern Number | Possible Pattern |
| --- | --- |
| 4A | (800) 847 6323, (800) 865 3243, (800) 753 8698, . . . |
| 4B | (800) [0-9][0-9][0-9] [0-9][0-9][0-9][0-9] |
| 4C | ([0-9][0-9][0-9]) [0-9][0-9][0-9] [0-9][0-9][0-9][0-9] |
| 4D | [0-9]+ [0-9]+ [0-9]+ |
| 4E | [ 0-9]+ |
| 4F | .+ |

Pattern 4A is precise but not very useful because the number of distinct values in the pattern is large. Pattern 4B is less precise but more useful than pattern 4A, allowing all "800" phone numbers. Pattern 4C is less precise than pattern 4B, allowing all U.S. telephone numbers. Pattern 4D allows all triplets of digit sequences separated by spaces. Pattern 4E allows any sequence of digits and spaces (e.g., 83 5234 2). Pattern 4F allows any sequence of characters such as digits or numbers. A human may select pattern 4B because the values appear to be phone numbers in an "800" phone number category.

Figure 4:
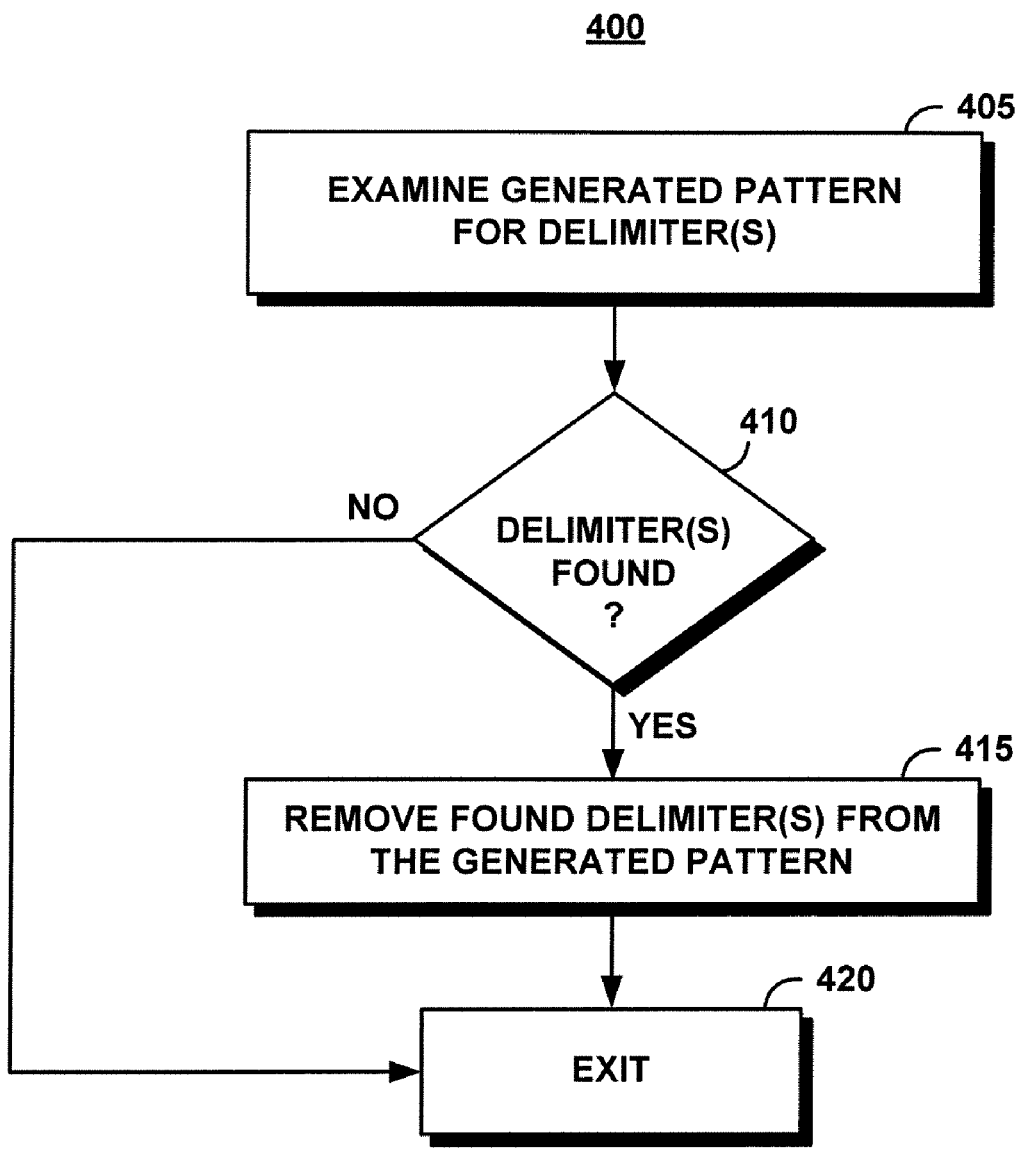
FIG. 4 is a process flow chart illustrating a method of operation of a delimiter removal module of the pattern matching system of FIGS. 1 and 2.

FIG. 4 illustrates a method 400 of the delimiter removal module 210. The delimiter removal module 210 performs method 400 on a pattern such as, for example, the pattern generated by the pattern construction module 205 in method 300. The delimiter removal module 210 examines the generated pattern for a presence of any delimiter(s) (step 405). The delimiter removal module 210 determines whether any delimiters are found in the generated pattern (decision step 410) by maintaining a frequency count of each symbol in the generated pattern. A symbol is a delimiter if it appears in the same position of the pattern for each value in a dataset. If one or more delimiters are found in the generated pattern, the delimiter removal module 210 removes the found delimiter(s) from the generated pattern (step 415) and exits method 400 (step 420). If no delimiter(s) are found (decision step 415), the delimiter removal module exits method 400 (step 420).

Consider input dataset 3 and input dataset 4. To a human, those number sequences appear similar despite some syntactic differences. Directly comparing input dataset 3 and input dataset 4 on a digit-by-digit or numerical value basis presents little similarity. However, comparing patterns derived from input dataset 3 and input dataset 4 reveals a high level of similarity. By comparing pattern 3B and 4B of each dataset, input dataset 3 and input dataset 4 appear similar. The delimiter removal module 210 identifies, locates, and removes delimiters from a pattern. Input dataset 3 comprises delimiters "800" and a "–" in two positions. Input dataset 4 comprises delimiters "(800)" and a space in two positions.

Applied to input dataset 3 and input dataset 4, the delimiter removal module 210 removes the delimiters, yielding a simpler pattern "[0-9][0-9][0-9][0-9][0-9][0-9][0-9]" (sequence of seven digits) for both input dataset 3 and input dataset 4. Comparing these simplified patterns indicate a high degree of similarity for input dataset 3 and input dataset 4.

Figure 5:
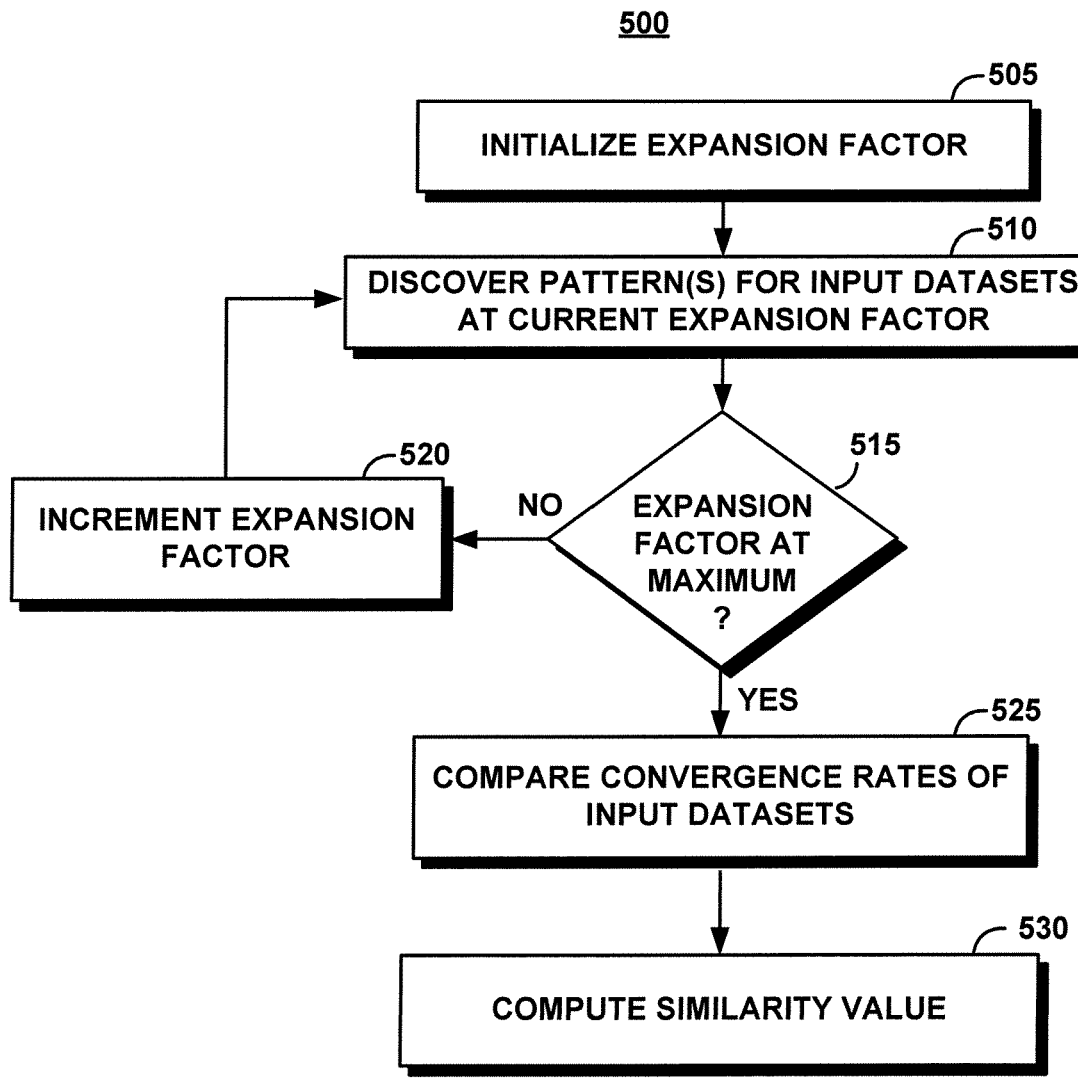
FIG. 5 is a process flow chart illustrating a method of operation of a similarity computation module of the pattern matching system of FIGS. 1 and 2.

FIG. 5 illustrates a method 500 of the similarity computation module 215 in computing a similarity between patterns generated by the pattern construction module 205 and the delimiter removal module 210. Method 500 measures a rate of convergence to a universal pattern (any character, repeated any number of times) for an input dataset.

Method 500 exploits the fact that patterns discovered for two disjoint datasets may look very different but "behave" in a similar fashion. Behavior is defined as an inherent property of an input dataset that determines how a pattern representing the input dataset diminishes in size or becomes more compact as a maximum allowed expansion factor increases and precision decreases. Referring to input dataset 4 previously described, pattern 4A, pattern 4B, pattern 4C, pattern 4D and pattern 4E exhibit this behavior by becoming increasingly compact as the expansion factor increases. Similarly, for input dataset 3, pattern 3A, pattern 3B, pattern 3C, pattern 3D and pattern 3E exhibit similar behavior.

The similarity computation module 215 initializes the expansion factor to a predetermined value such as, for example, one (step 505). The similarity computation module 215 discovers one or more patterns for the input datasets at the current expansion factor (step 510). The similarity computation module 215 determines whether the expansion factor is at a predetermined maximum value (i.e., an expansion factor threshold) (decision step 515). If the expansion factor is not at the predetermined maximum value, the similarity computation module 215 increments the expansion factor (step 520). As the value of the expansion factor increases, the pattern becomes more compact and more general. The similarity computation module 215 repeats steps 510 through 520 until the expansion factor is at the predetermined maximum value (decision step 515). The similarity computation module 215 compares convergence rates of the input datasets (step 525). The similarity computation module 215 computes a similarity value of the input datasets (step 530).

Figure 6:
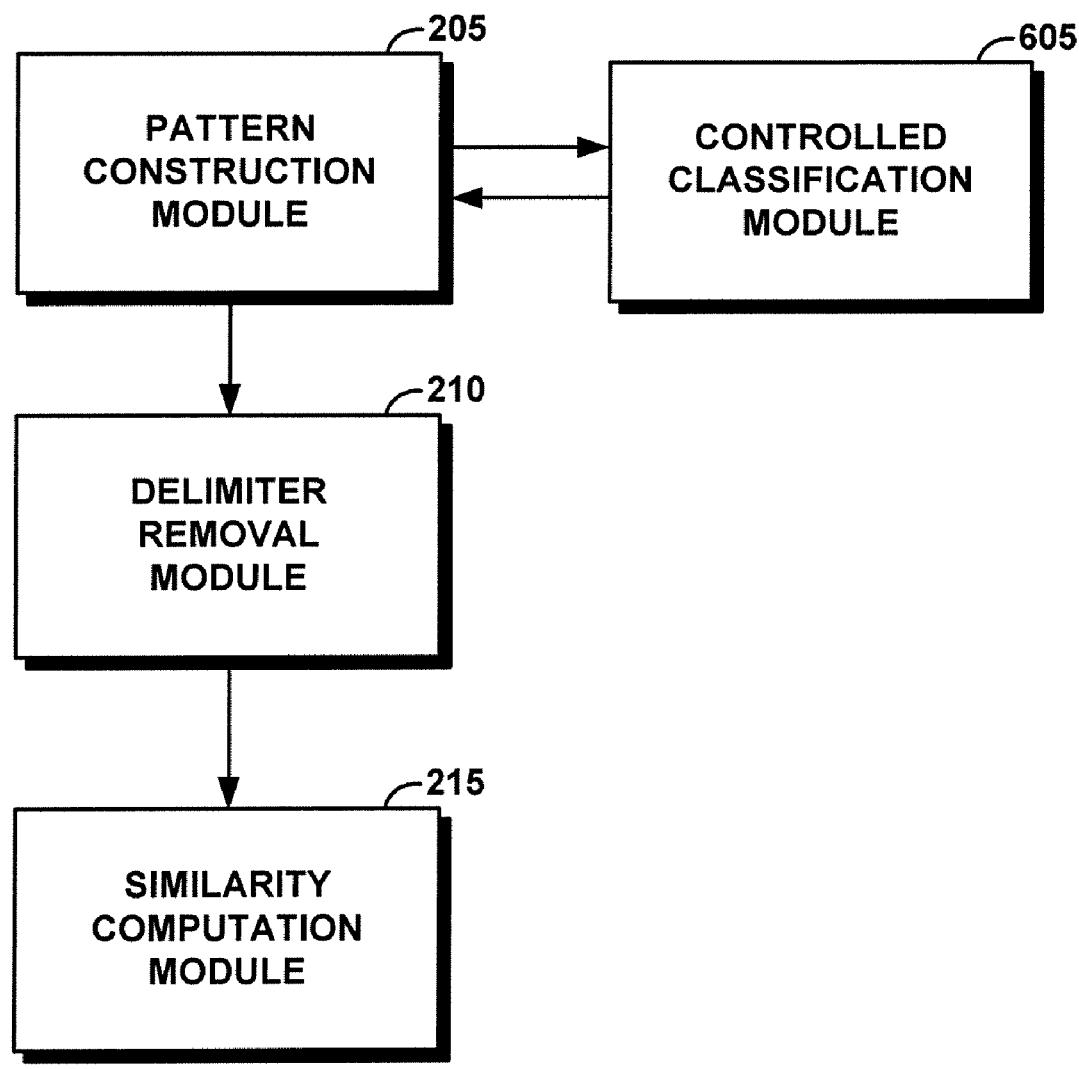
FIG. 6 is a block diagram of the high-level architecture of one embodiment of the pattern matching system of FIG. 1 utilizing a controlled classification module.

FIG. 6 illustrates a high-level architecture of one embodiment of system 10, system 10A, in which a controlled classification module 605 generalizes, with respect to symbol classes, symbols in an input dataset. The controlled classification module 605 threads vocabulary expansion on the input dataset such that a subset of symbols appearing in a node may be expanded to a symbol class while the remaining symbols are not expanded. For example, an input dataset in the form of a sequence 1, 3, 4, 7, 9, A, K, X may produce the pattern "[13479AKX]" before expansion and "[0-9AKX]" after expansion of the digits. The controlled classification module 605 can further generalize symbols excluding those symbols with insufficient evidence to warrant generalization over the entirety of the excluded symbol class.

Figure 7A:
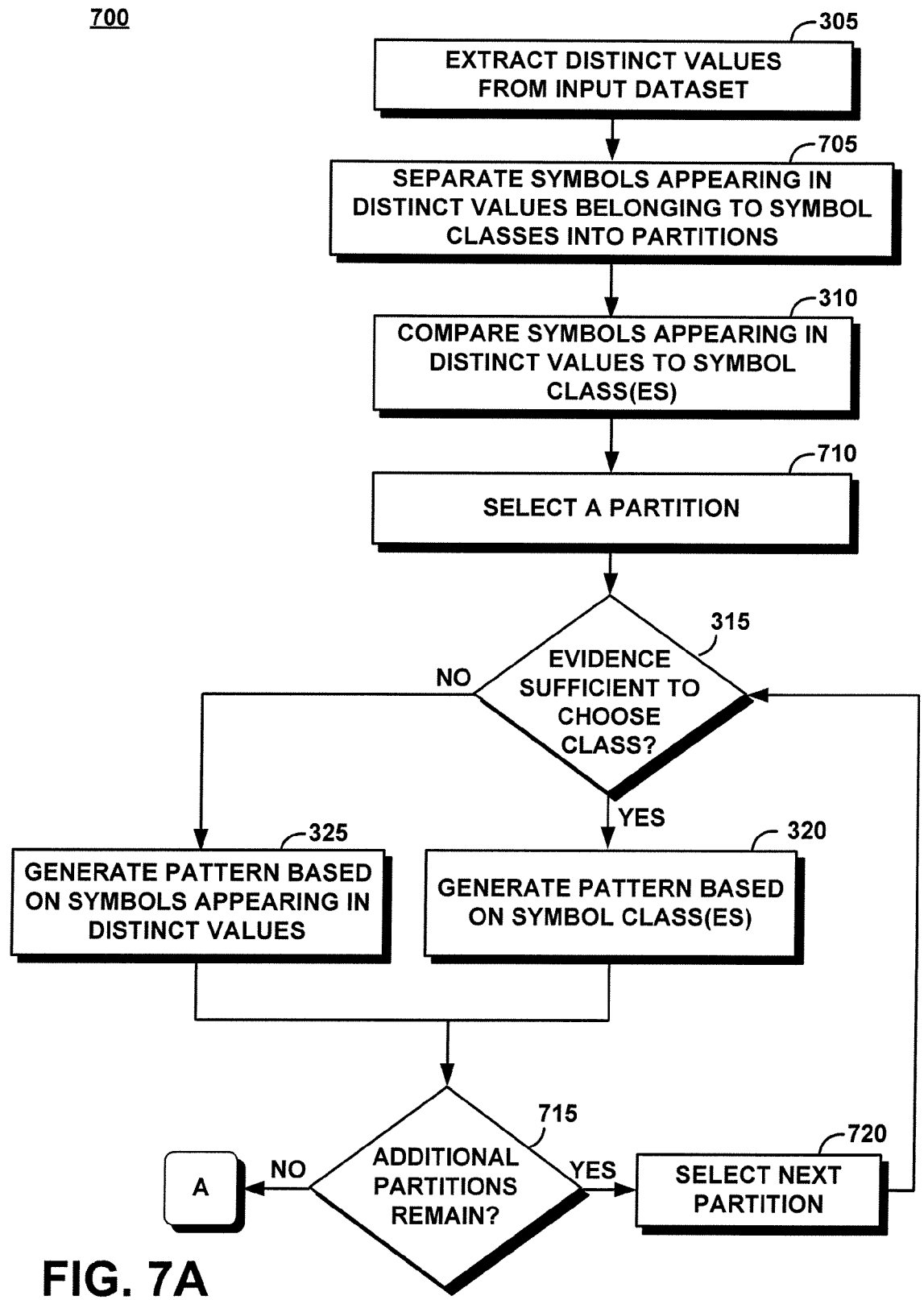
FIG. 7 is comprised of FIGS. 7A and 7B and represents a process flow chart illustrating a method of operation of one embodiment of the pattern matching system of FIGS. 1 and 6 in controlling classification of values in an input dataset during vocabulary expansion.
Figure 7B:
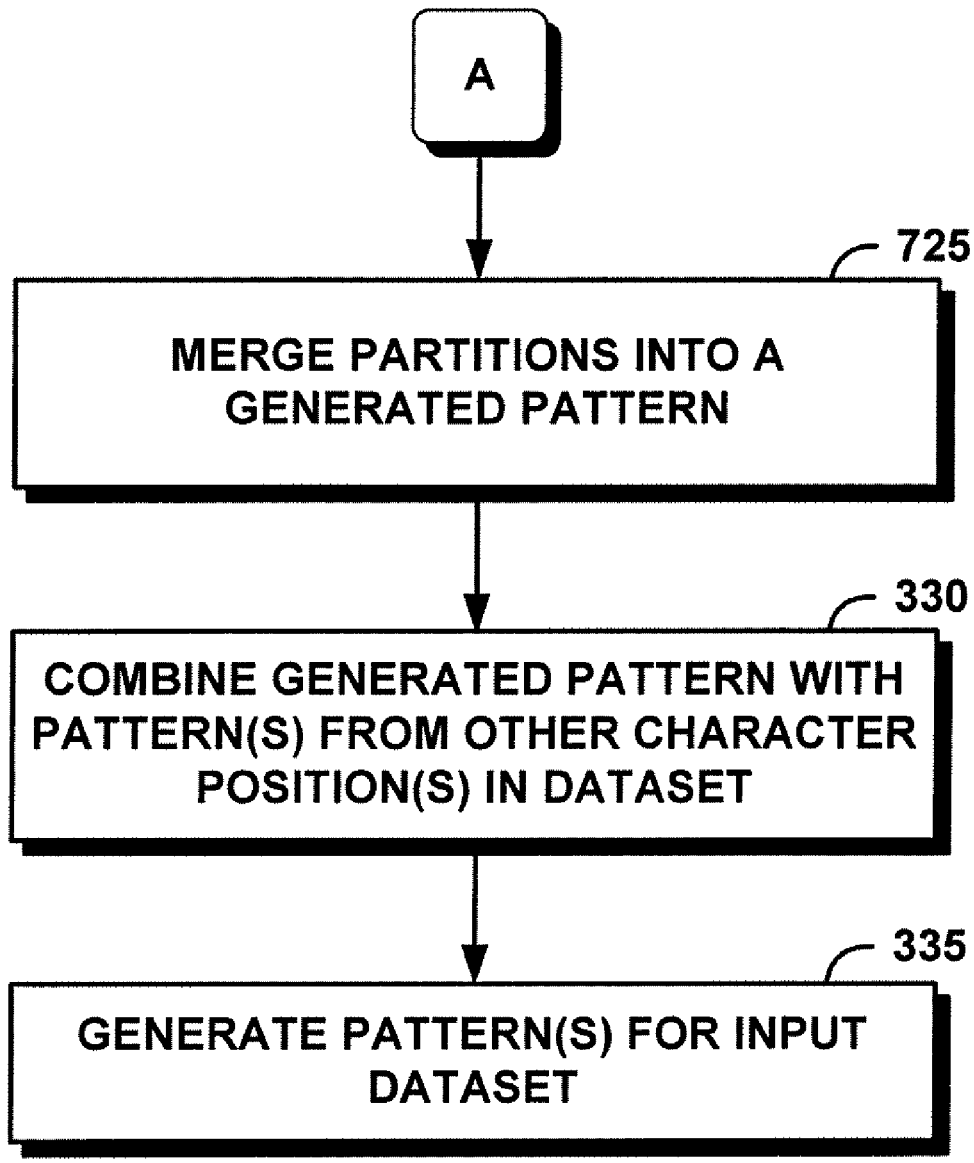

FIG. 7 (FIGS. 7A, 7B) illustrates a method 700 of system 10A in controlling classification of an input dataset during vocabulary expansion. System 10A utilizes the pattern construction module 205 to perform step 305, as described previously. The controlled classification module 605 separates symbols appearing in given character positions in distinct values into partitions such that each partition corresponds to a different symbol class (step 705). The pattern construction module 205 compares symbols appearing in distinct values to symbol classes as described previously (step 310).

The controlled classification module 605 selects a partition (step 710). The pattern construction module 205 generates a pattern based on unexpanded symbols appearing in given character positions in distinct values or on one or more symbol classes as described previously (step 315 through step 325). The controlled classification module 605 determines whether additional partitions remain for processing (decision step 715). If yes, the controlled classification module 605 selects a next partition (step 720). System 10 repeats step 315 through step 720 until no additional partitions remain for processing (decision step 715).

The controlled classification module 605 merges partitions into a generated pattern (step 725). The pattern construction module 205 performs step 330 and 335 as described previously to generate one or more dataset patterns.

Figure 8:
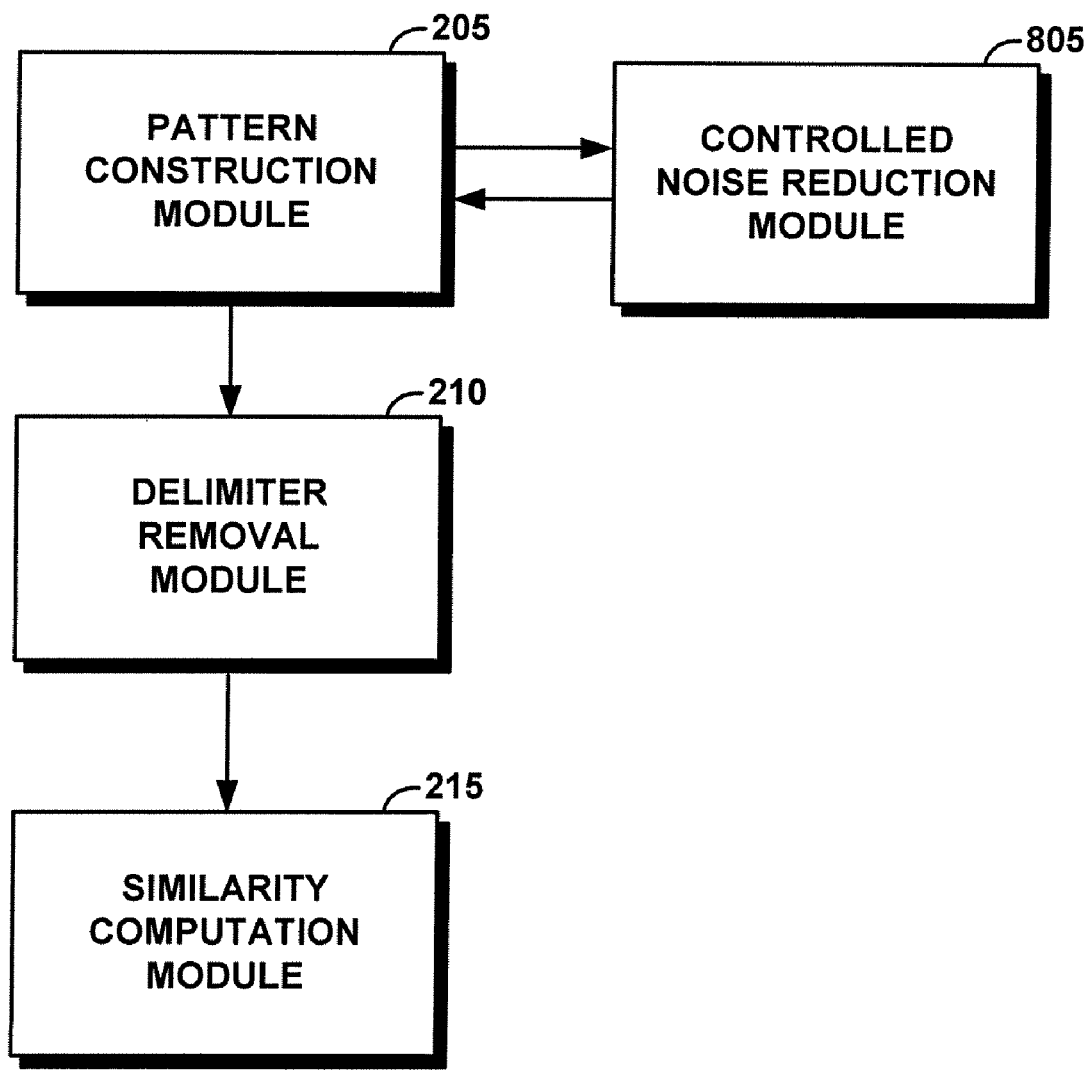
FIG. 8 is a block diagram of the high-level architecture of one embodiment of the pattern matching system of FIG. 1 utilizing a controlled noise reduction module.

FIG. 8 illustrates a high-level architecture of another embodiment of system 10, system 10B, in which a controlled noise reduction module 805 reduces noise in an input dataset. Noisy input datasets can produce patterns that are difficult for humans to understand. Furthermore, noisy input datasets can reduce the opportunity to produce compact patterns. For example, the sequence 1, 3, 4, 7, 9, x may produce a pattern "[0-9x]" that leads an observer to wonder why x is present in the input dataset. Indeed, if closer examination of the input dataset reveals that "x" appears very infrequently compared to the other symbols (digits), then system 10B can eliminate x from the language and simplify the pattern to "[0-9]".

Noise removal by system 10B further leads to compact patterns when repetition is considered. For example, a sequence 1, 25, 64, 3, x without noise removal may produce the pattern "[0-9x]|[0-9][0-9]". When the character "x" is removed from the input dataset, system 10B can simplify the pattern to "[0-9]{1,2}" indicating that a digit appears one or two times.

Figure 9:
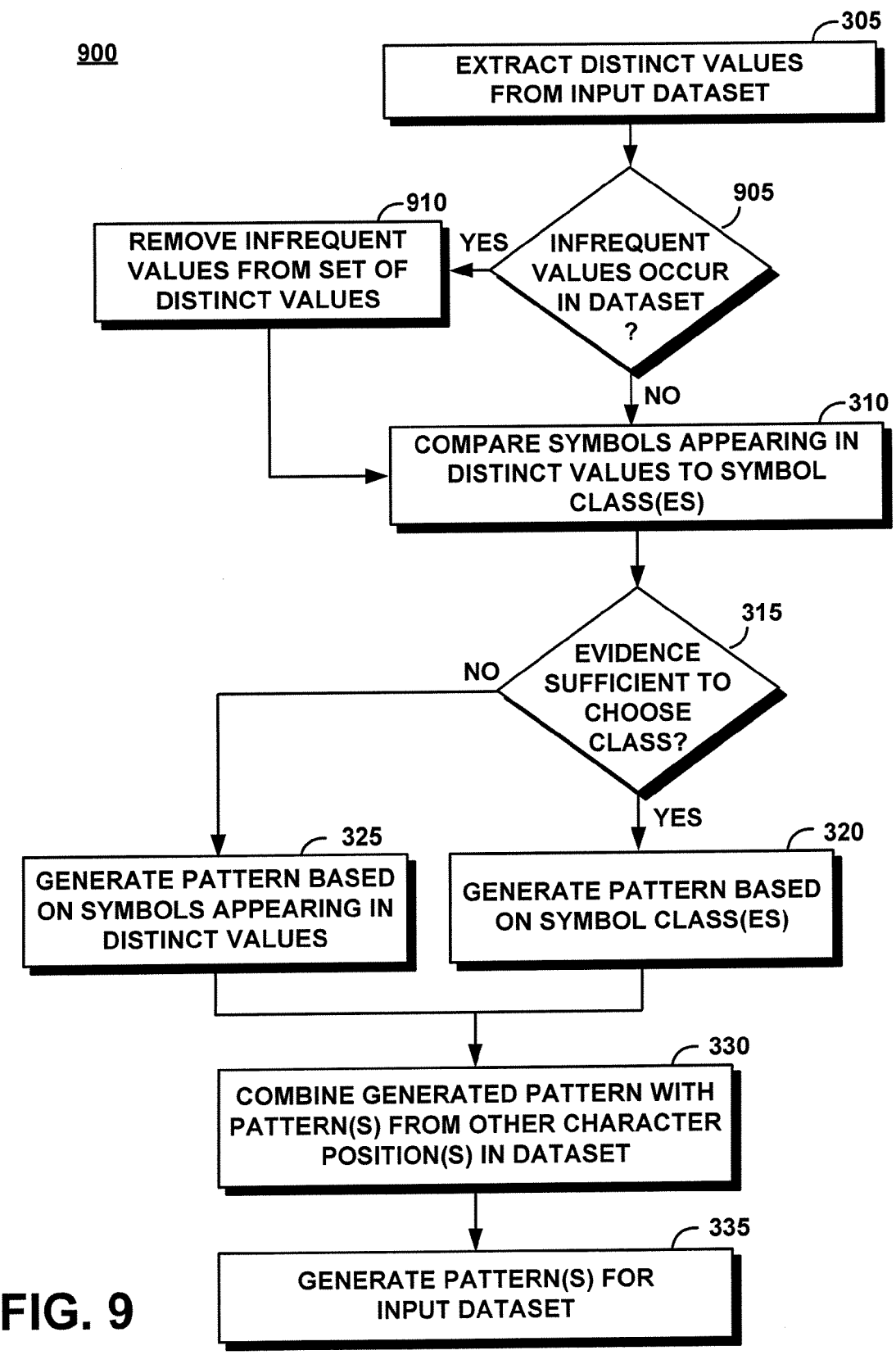
FIG. 9 is a process flow chart illustrating a method of operation of one embodiment of the pattern matching system of FIGS. 1 and 8 in reducing noise in an input dataset during vocabulary expansion.

FIG. 9 illustrates a method 900 of system 10B in reducing noise in an input dataset during vocabulary expansion. System 10B utilizes the pattern construction module 205 to perform step 305, as described previously. The controlled noise reduction module 805 determines whether infrequent values occur in the input dataset (decision step 905). Designation of a value as infrequent is determined by comparison with a predetermined frequency threshold relative to other values in the input dataset. If infrequent values occur, the controlled noise reduction module 805 removes the found infrequent values from the set of distinct values in the input dataset (step 910). The pattern construction module 205 performs step 315 through step 335, as described previously, to generate a pattern for the input dataset with noise removed.

Figure 10:
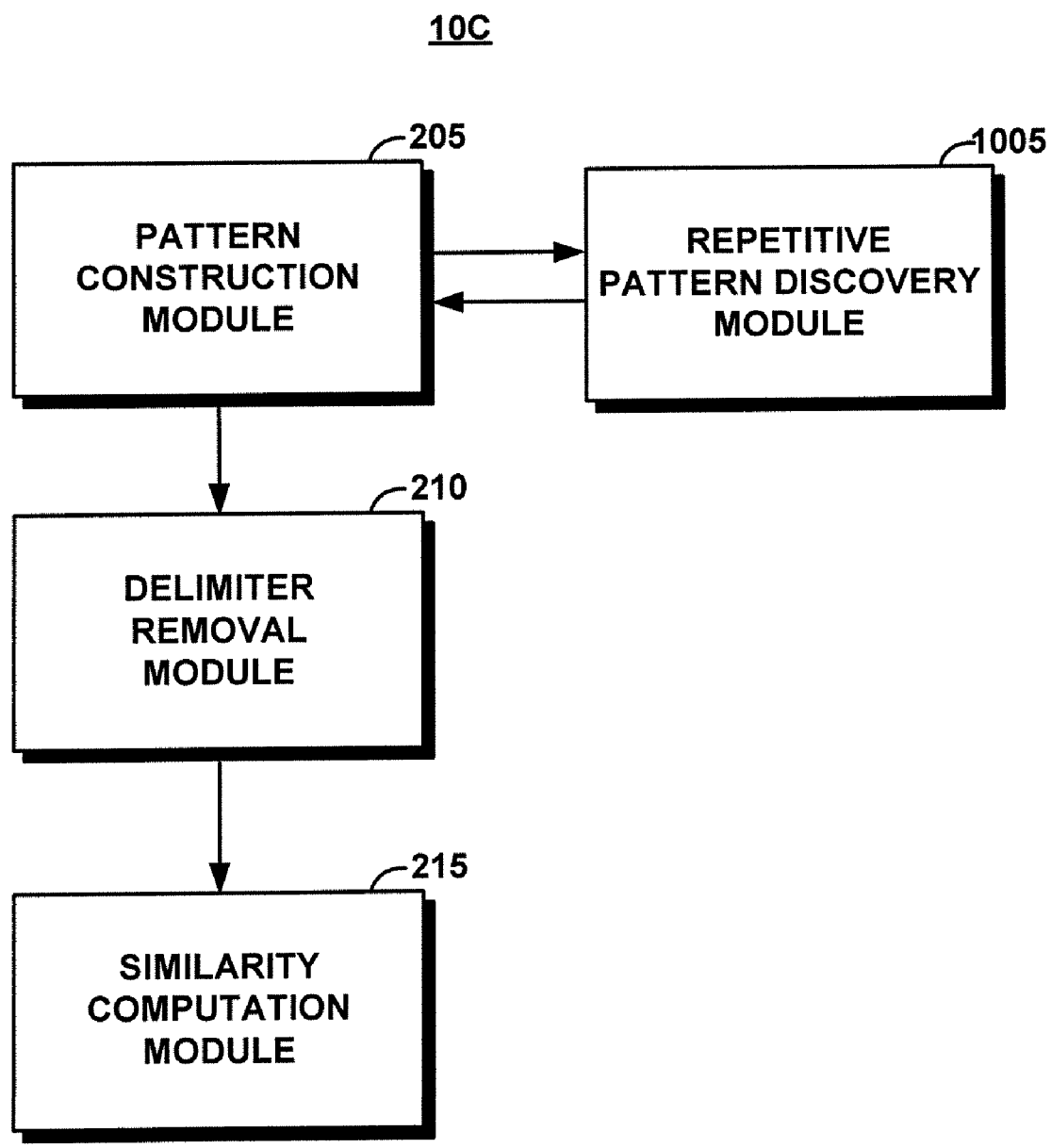
FIG. 10 is a block diagram of the high-level architecture of one embodiment of the pattern matching system of FIG. 1 utilizing a repetitive pattern discovery module.

FIG. 10 illustrates a high-level architecture of a further embodiment of system 10, system 10C, in which a repetitive pattern discovery module 1005 discovers repetitive values in an input dataset. The repetitive discovery module 1005 identifies a repeating sequence in an input dataset and determines a minimum and maximum length of that repeating sequence, producing a repetitive pattern. Identifying repetitive patterns allows system 10C to produce compact patterns. For example, a sequence 1, 3, 4, 7, 9, 25, 64, 123 without repetition detection may produce the pattern "[0-9]|[0-9][0-9]|[0-9][0-9][0-9]" which is difficult to interpret. A closer examination reveals that the pattern is really a sequence of digits of length 1, 2, or 3. In other words, the pattern may be written as "[0-9]{1,3}" where 1 and 3 indicate the minimum and maximum length, respectively.

Figure 11:
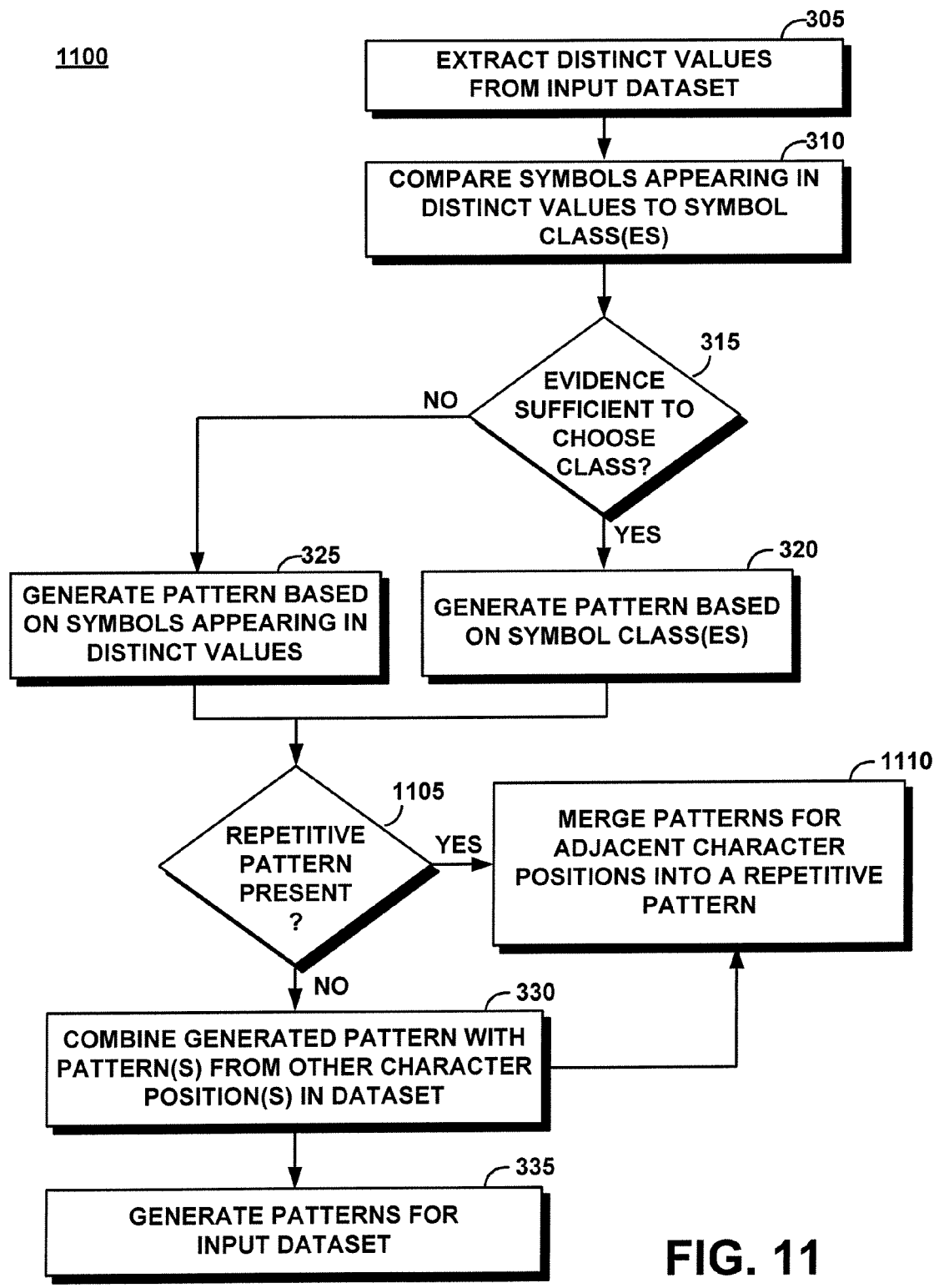
FIG. 11 is a process flow chart illustrating a method of operation of one embodiment of the pattern matching system of FIGS. 1 and 10 in discovering repetitive patterns in an input dataset during vocabulary expansion.

FIG. 11 illustrates a method 1100 of system 10C in identifying and quantifying one or more repetitive patterns in an input dataset during vocabulary expansion. As described previously, the pattern construction module 205 generates a pattern based either on unexpanded symbols appearing in given character positions in distinct values or on one or more symbol classes in step 305 to step 325. The repetitive pattern discovery module 1005 determines whether the patterns of two adjacent character positions form a repetitive pattern (step 1105). If yes, the repetitive pattern discovery module 1005 merges the two adjacent patterns into a repetitive pattern. The pattern construction module 205 continues with step 330 and step 335, as previously described. If no repetitive patterns are present (decision step 1105), the pattern construction module 205 completes step 330 and step 335.

Figure 12:
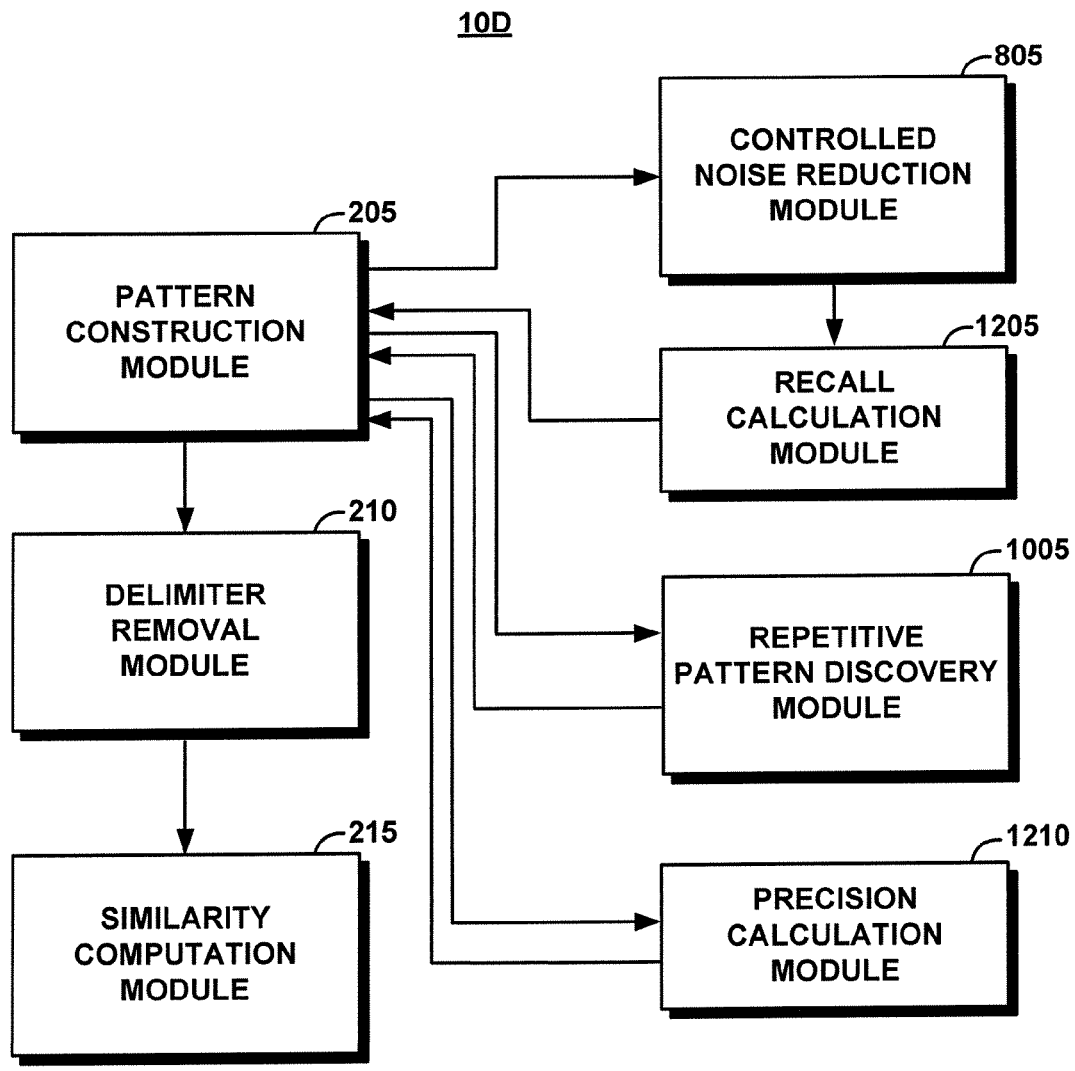
FIG. 12 is a block diagram of one embodiment of the high-level architecture of the pattern matching system of FIG. 1 utilizing a recall calculation module and a precision calculation module.

FIG. 12 illustrates a high-level hierarchy of yet another embodiment of system 10, system 10D, in which a recall calculation module 1205 calculates a recall value for a generated pattern and a precision calculation module 1210 calculates a precision value for a generated pattern. Using the notation L(P) and L(I) discussed previously, precision is defined as |L(P) intersect L(I)|/|L(P)|. Similarly, recall is defined as |L(P) intersect L(I)|/|L(I)|.

Recall is the fraction of the input dataset that matches the pattern. If no noise is removed from the input dataset, all the data that was in the input dataset is in the pattern and recall is 100%. With noise removed, some values are removed from the input dataset before a pattern is generated; consequently, recall is less than 100%. In general, system 10 removes "noisy nodes" and their support values during noise reduction. This removal occurs after support values are normalized.

At each node the support values of transitions to all children are adjusted so that their sum equals one. The adjusted, fractional support values represent the relative frequency of each transition. Removing nodes (and transitions to and from them) reduces the sums and the overall support of the deterministic finite automaton. The overall support of the deterministic finite automaton is the recall value. In one embodiment, system 10 computes recall by a repeat scanning the input data and testing the acceptance of input data values by the pattern that was learned by system 10.

The precision calculation module 1210 calculates precision by maintaining expansion values in each node and calculating at the end of the learning process how much the pattern has expanded overall. The precision calculation module 1210 can also calculate precision by dividing the number of distinct input data values by the size of the language described by the pattern.

Figure 13A:
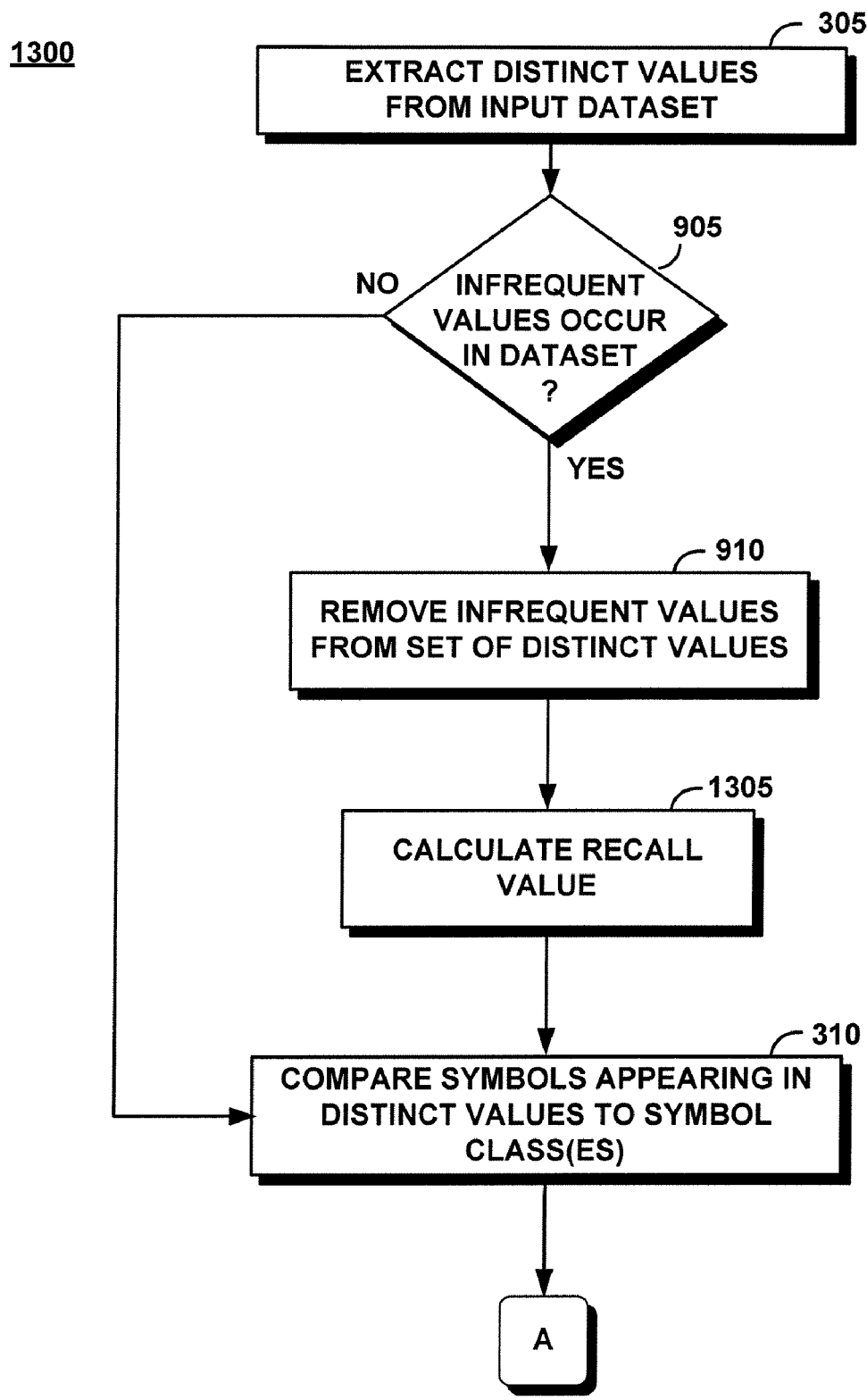
FIG. 13 is comprised of FIGS. 13A and 13B and represents a process flow chart illustrating a method of operation of one embodiment of the pattern matching system of FIGS. 1 and 12 in which recall and precision are calculated for a pattern representing an input dataset during vocabulary expansion.
Figure 13B:
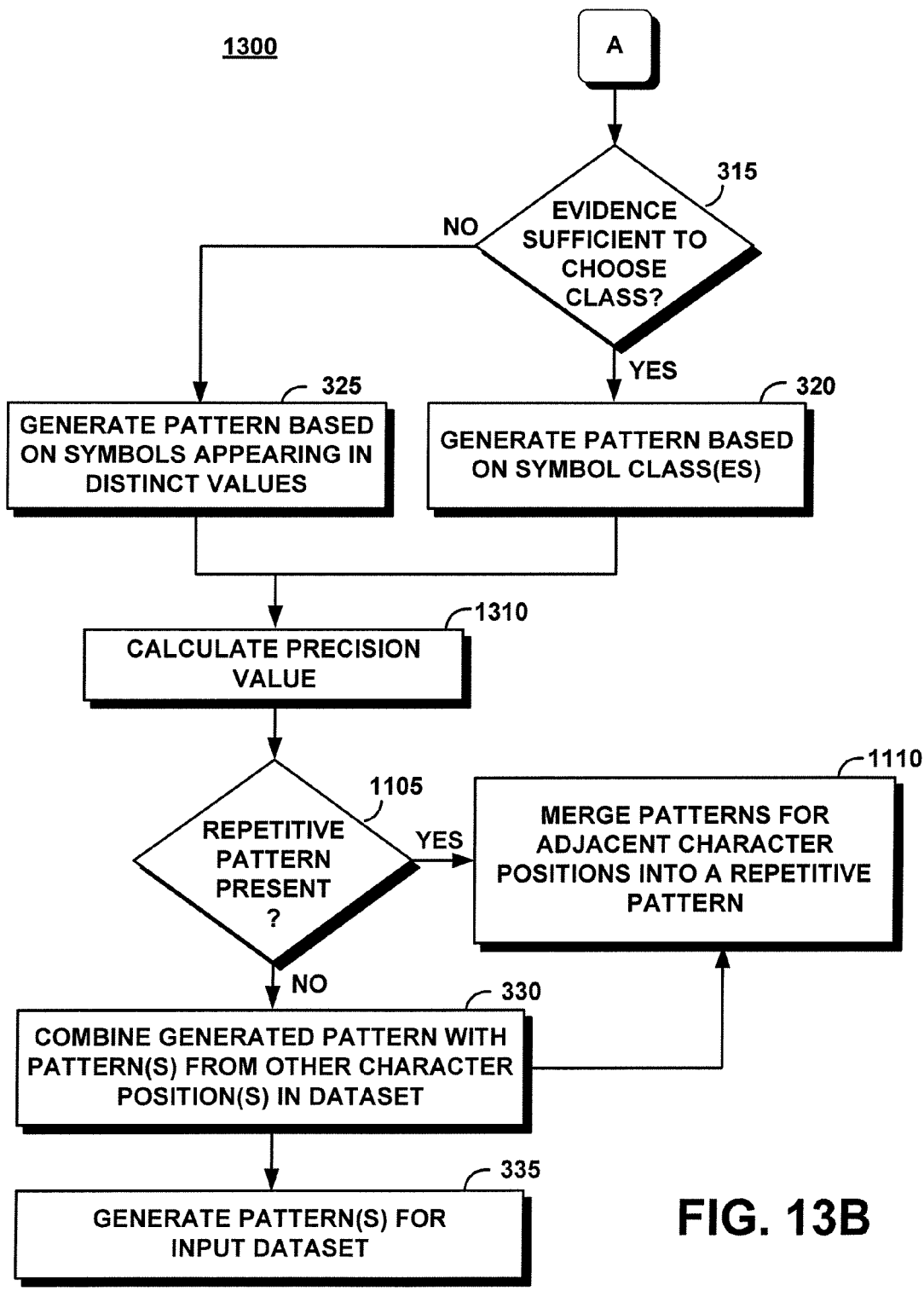

FIG. 13 (FIGS. 13A, 13B) illustrates a method 1300 of system 10D in determining recall and precision for a generated pattern. The pattern construction module 205 performs step 305 as previously described. The controlled noise reduction module performs decision step 905 and step 910 as previously described. If infrequent values are found in the input dataset (decision step 905) and removed (step 910), the recall calculation module 1205 calculates a recall value based on the values removed. The pattern construction module 205 performs step 310 through step 325 as described previously.

The precision calculation module 1210 calculates a precision value (step 1310). The repetitive pattern discovery module 1005 performs decision step 1105 and step 1110 as described previously. The pattern construction module 205 performs step 330 and step 335 as previously described, generating one or more patterns for the input dataset.

An exemplary, high-level pseudocode that illustrates the operation of system 10 is given below:

```
Set maxNodeExpansion = input value
Set maxNoiseSigma = input value
Set maxNoiseFraction = input value
Create initial node Ns and end node Nf and create transition from
Ns to Nf.
For each input value V
    Set current node Nc = Ns
    For each symbol Vi in input value V
        If Nc does not have a transition to a node which matches
Vi then
            Create new node Nnew which matches Vi
            Set Nnew.expansion = 1
            Create transition T from Nc to Nnew
            Set T.support = 0
        End if
        Find transition T from Nc to node Nnext which matches Vi
        Set T.support = T.support + 1
        Set Nc = Nnext
    End for
    Create transition from Nc to Nf if one does not exist already
```

-continued

```
End for
While true
    For each node N in DFA
        Set S = Union of all symbol sets in nodes Nnext which have
a transition from N
        For each symbolclass C
            If |C| / |S intersect C| < maxNodeExpansion then
                For each node Nnext which have a transition
from N
                    If C contains all symbols of Nnext then
promote Nnext to C
                    End for
                End if
            End for
        End for
    Calculate similarity of each pair of nodes N1 and N2 in DFA
(symbol sets, successor nodes, predecessor nodes)
    Set N1, N2 = pair of nodes with highest similarity score
    If no pair can be merged, exit loop
    Merge N1, N2
End while
Normalize support values in DFA such that sum(transition-
from (N).support) = 1 for each N
For each node N in DFA
    Set { Tsibling } = transitions from parent of N to siblings of N
    Set maxSupport = max of { Tsibling.support }
    Set meanSupport = average of { Tsibling.support }
    Set stddevSupport = standard deviation of { Tsibling.support }
    Set support = transition-to(N).support
    If support < meanSupport − maxNoiseSigma * stddevSupport or
support < maxSupport * maxNoiseFraction then
        Remove N from DFA
    End if
End for
```

It is to be understood that the specific embodiments of the invention that have been described are merely illustrative of certain applications of the principle of the present invention. Numerous modifications may be made to the system, method, and service for matching pattern-based data described herein without departing from the spirit and scope of the present invention. While the present invention is described in terms of a database, it should be clear that the present invention is applicable as well to, for example, any data source comprising a set of values in the form of, for example, numbers, characters, symbols, etc.

What is claimed is:

1. A system for matching pattern-based data, comprising a computer which executes:
   a pattern construction module for deriving a first pattern from a first input set of values and a second pattern from a second input set of values;
   a similarity computation module for computing a similarity of the first pattern and the second pattern;
   a learning module, wherein the system learns the first pattern and the second pattern by constructing an automaton comprised of nodes and transitions between the nodes, and support levels are calculated for the nodes;
   a delimiter removal module that removes one or more delimiters from the first pattern by calculating the support level at one of the nodes by summing support values of incoming transitions to that node;
   a matching module for matching the first input set of values with the second input set of values based on the similarity computation; and
   an output module that outputs the similarity match to a user.

2. The system of claim 1, wherein the pattern construction module generalizes the first derived pattern and the second derived pattern by representing symbols appearing in given positions in the values from the first and second sets of values with symbol classes.

3. The system of claim 2, wherein the pattern construction module generalizes a pattern by choosing symbol classes that minimize the expansion of symbols appearing in given positions in the values with members of the symbol classes.

4. The system of claim 2, further comprising a controlled classification module for partitioning symbol ranges into subsets; and wherein each subset is generalized separately to a symbol class.

5. The system of claim 1, further comprising a delimiter removal module for identifying and removing delimiters from the first derived pattern and the second derived pattern.

6. A computer program product having a plurality of executable instruction codes that are stored on a computer-readable storage medium, for matching pattern-based data, comprising:

instruction codes that derive a first pattern from a first input set of values and a second pattern from a second input set of values;

instruction codes that compute a similarity of the first pattern and the second pattern;

instruction codes that perform a learning of the first pattern and the second pattern by constructing an automaton comprised of nodes and transitions between the nodes;

instruction codes that calculate support levels for the nodes;

instruction codes that remove one or more delimiters from the first pattern by calculating the support level at one of the nodes by summing support values of incoming transitions to that node;

instruction codes that match the first input set of values with the second input set of values based on the similarity computation; and instruction codes that output the similarity match to a user.

7. A method of matching pattern-based data, comprising:

deriving a first pattern from a first input set of values and a second pattern from a second input set of values;

computing by using a computer processor a similarity of the first pattern and the second pattern;

performing a learning of the first pattern and the second pattern by constructing an automaton comprised of nodes and transitions between the nodes;

calculating support levels for the nodes;

removing one or more delimiters from the first pattern by calculating the support level at one of the nodes by summing support values of incoming transitions to that node;

initializing an expansion factor;

expanding a language of the first and second patterns at the expansion factor, the expanding of the language diminishing a size of the first and second patterns and decreasing a precision of the first and second patterns;

matching the first input set of values with the second input set of values based on the similarity computation; and outputting the similarity match to a user.

* * * * *